United States Patent

Eibensteiner

[15] 3,681,539

[45] Aug. 1, 1972

[54] TAPE DIVERTING DEVICE IN A TAPE RECORDER APPARATUS WITH DRUM SHIFT DURING TAPE ENGAGEMENT

[72] Inventor: Walter Eibensteiner, Vienna, Austria

[73] Assignee: U.S. Philips Corporation, New York, N.Y.

[22] Filed: July 20, 1970

[21] Appl. No.: 56,490

[30] Foreign Application Priority Data

Aug. 4, 1969 Austria ....................A 7474/69

[52] U.S. Cl. ....................179/100.2 Z, 179/100.2 T, 242/55.19 A, 226/91, 274/4 E

[51] Int. Cl. ....................G11b 15/66, G11b 23/04

[58] Field of Search ....................179/100.2 Z, 100.2 T, 100.2 MD 274/4 C, 4 D, 4 E, 4 F, 11 F, 11 D; 242/55.19 A

[56] References Cited

UNITED STATES PATENTS

| | | | |
|---|---|---|---|
| 2,911,215 | 11/1959 | Cousino | 179/100.2 Z |
| 3,555,205 | 1/1971 | Barkouki | 179/100.2 T |

FOREIGN PATENTS OR APPLICATIONS

| | | | |
|---|---|---|---|
| 1,537,240 | 10/1969 | Germany | 179/100.2 T |

OTHER PUBLICATIONS

IBM Technical Disclosure Bulletin, Johnson et al., Vol. 9 No. 8 January 1967

*Primary Examiner*—Bernard Konick
*Assistant Examiner*—Alfred H. Eddleman
*Attorney*—Frank R. Trifari

[57] ABSTRACT

An apparatus for recording and/or playback of signals having a wide frequency spectrum carried on a tape carrier accommodated on a cassette. The cassette is provided with an opening across which the tape extends when not being played or not in an operative condition. The tape cassette is placed on the apparatus in a playback position on a supporting base. The apparatus has a cylindrically shaped drum mounted adjacent the cassette having its longitudinal axis at an angle to the axis normal to the principal plane of the cassett. A tape diverting device having a support member mounted for rotational movement about said drum and having at least one tape guide stud mounted thereon and projecting through the opening in the cassette when the cassette is placed on the apparatus for engaging the tape as the tape diverting device is rotated about the drum. Rotation of the supporting member of the tape diverting device will cause the tape guide stud to engage the tape and draw the tape out of the cassette and wind it, in a helical path, around the cylindrical surface of the drum to thereby place the tape in an operative position for playback in contact with transducer heads.

17 Claims, 12 Drawing Figures

INVENTOR.

WALTER EIBENSTEINER

BY [signature]

AGENT

INVENTOR.
WALTER EIBENSTEINER
BY
AGENT

INVENTOR.
WALTER EIBENSTEINER
BY
AGENT

INVENTOR.
WALTER EIBENSTEINER
BY
AGENT

TAPE DIVERTING DEVICE IN A TAPE RECORDER APPARATUS WITH DRUM SHIFT DURING TAPE ENGAGEMENT

The invention relates to a tape recording and/or play-back apparatus. It is intended for use with signals having a wide frequency spectrum. In such a device a record carrier is accommodated in a cassette and can be brought out from the cassette and wound along a helical path around part of the cylindrical outer surface of a drum by means of a displaceable tape diverting device having at least one tapeguide stud. When the cassette is placed on the apparatus the tape guide stud projects into an opening in the cassette and engages a portion of the tape which extends in the region of the cassette opening. In such apparatus it has already been proposed to provide a tape diverting device with two tapeguide studs which are adapted to be displaced in a direction at right angles to the path of the tape in the cassette and which, with the tape wound about the drum, are located diametrically opposite one another laterally of the drum.

According to the invention, in an apparatus of the aforementioned kind, the tape diverting device is arranged so as to be pivotable along an arc of a circle away from the cassette, when the latter has been placed on the apparatus, about part of the drum, whilst during the pivoting movement of the tape diverting device the tape is engaged by the tape guide and is wound around the cylindrical outer surface of the drum. The steps according to the invention ensure a particularly simple and reliable construction which permits a satisfactory control of the tolerances in respect of the relative positions of the tape diverting device and the drum which have to satisfy stringent requirements.

The pivotal movement of the tape diverting device can be effected in a variety of manners. Advantageously the tape diverting device includes a support carrying the tape guide stud, which support is pivotable about an axis arranged at right angles to the principal plane of the cassette. It has been found to be particularly advantageous for the tape diverting device to be provided with a support which carries the tape guide stud and is pivotable about an axis extending in the same direction as the drum axis. In this case a particularly accurate construction is obtainable by designing the support and the drum as an integral unit adapted to pivot about the axis of the support. An arrangement which is particularly advantageous is obtained if, with the tape wound around the drum, the drum axis is closer to the cassette than is the pivoting axis of the tape diverting device.

Obviously, there are several manners in which the tape diverting device can be pivoted. For example, it may be effected by means of a separate control member which actuates the tape diverting device through a toothed gearing. It has proved advantageous to use a servo motor for pivoting the tape diverting device. A simple construction which is highly effective for operating the apparatus is obtained when the tape diverting device is pivoted by means of a handle having a part which extends above the drum and preferably acts as a cover for the drum.

An advantageous starting position for winding the tape around the drum and a particularly accurate winding operation is obtained if a tape guide arrangement is provided on the drum and is caused to bear the tape on the tape guide when the cassette is placed in the operative position.

Further, it has proved highly advantageous for the tape diverting device to have two tape guide studs which when the cassette is placed on the apparatus engage the tape. One of these studs, with the tape wound on the drum, guides the tape with respect to the drum, whilst the other stud holds the part of the tape travelling between the said one stud and the cassette spaced away from the drum and may, if required, divert the tape.

To obtain a high degree of reliability, the following features have been found to be of advantage. The first feature is that the on/off switch of the apparatus can be operated when the tape diverting device is pivoted. Further, the tape diverting device may operate a locking device which, with the tape wound around the drum, locks the cassette in its position on the apparatus. In this case the locking device preferably also acts to prevent cassettes from being placed on the apparatus when the tape guide stud has been pivoted towards the drum. Also, it has proved of advantage that when the tape diverting device is being pivoted, preferably at the beginning of its movement, any mode of operation of the apparatus can be stopped, for example by actuation of an automatic stop or by returning the mode switch to its inoperative position.

The invention will now be described more fully with reference to the accompanying drawings in which.

Figure 3:
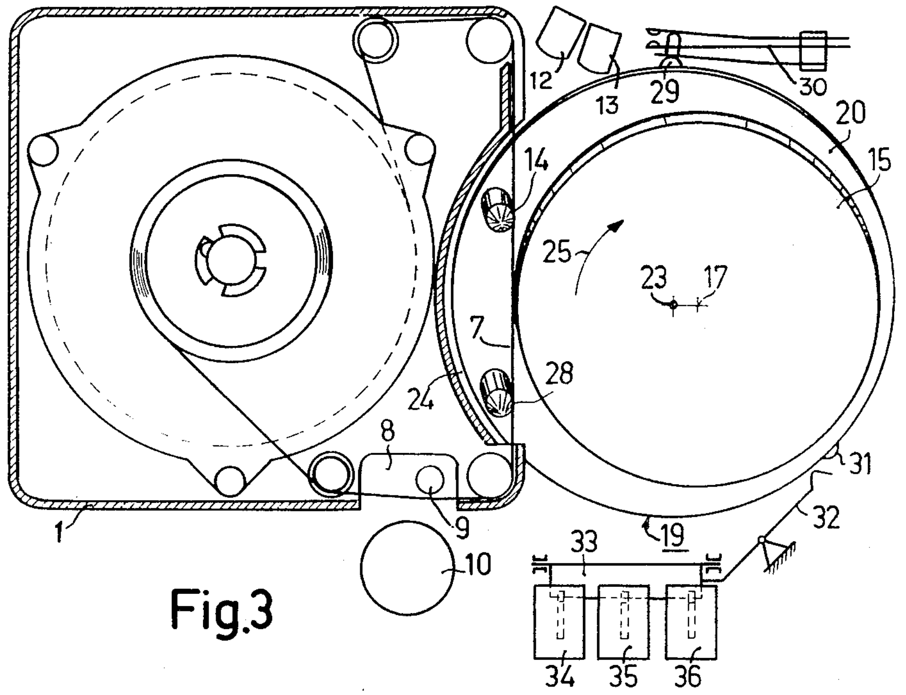
FIGS. 3 and 4 show the two operative conditions of a tape diverting device having two tape guide studs, permitting the tape to be wound around the cylindrical outer surface of the drum through 180°.
Figure 4:
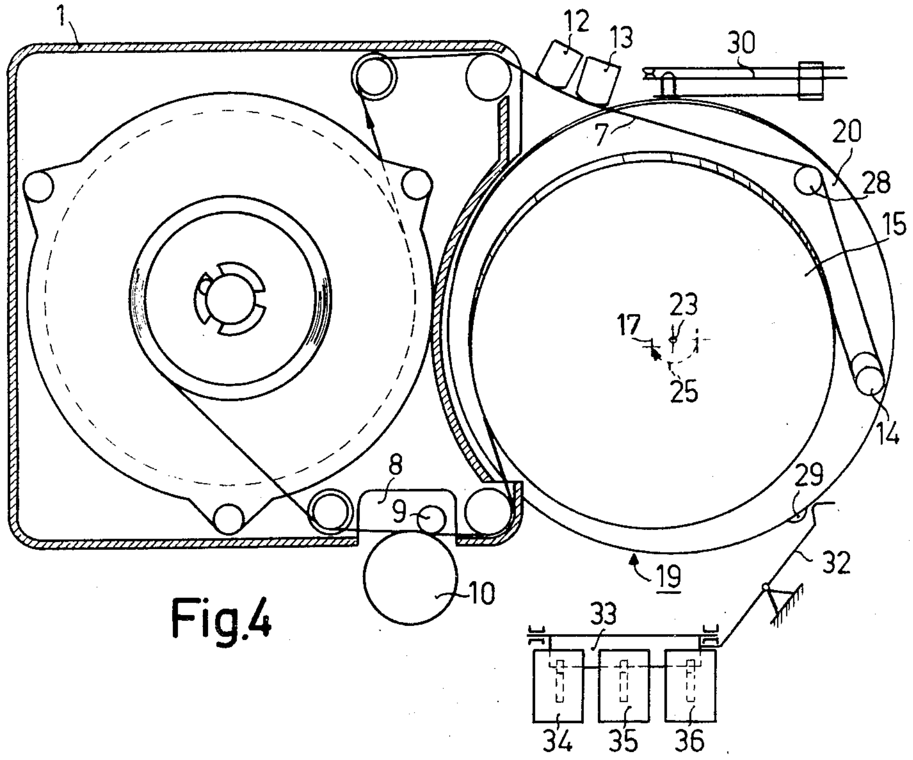
Figure 10:
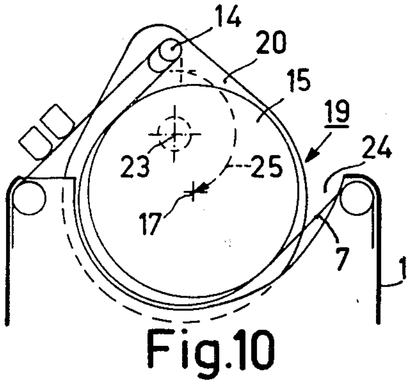
Figure 9:
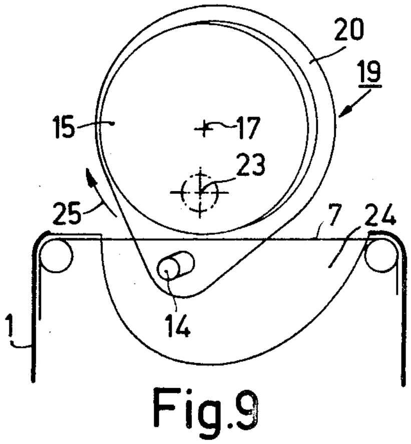
Figure 11:
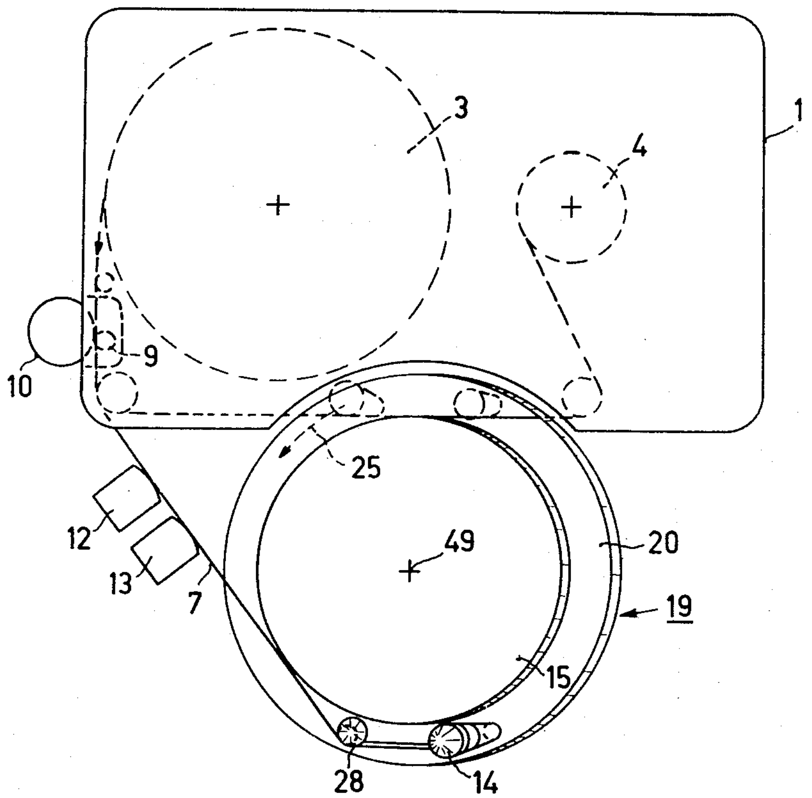
Figure 12:
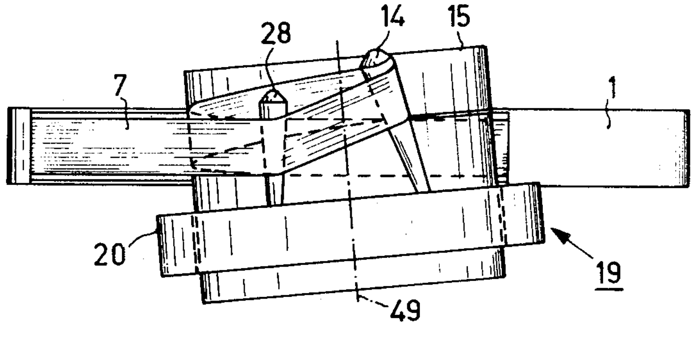

FIGS. 9 and 10 show the two operational positions of a tape diverting device similar to the embodiment shown in FIGS. 3 and 4 in which, however, only one tape guide stud is used; and FIGS. 11 and 12 show diagrammatically a top plan view and a side elevation respectively of a tape diverting device having two tape guide studs, which is shown in the operative position co-operating with a tape cassette containing two tape reels arranged side by side in one plane.

Figure 1:
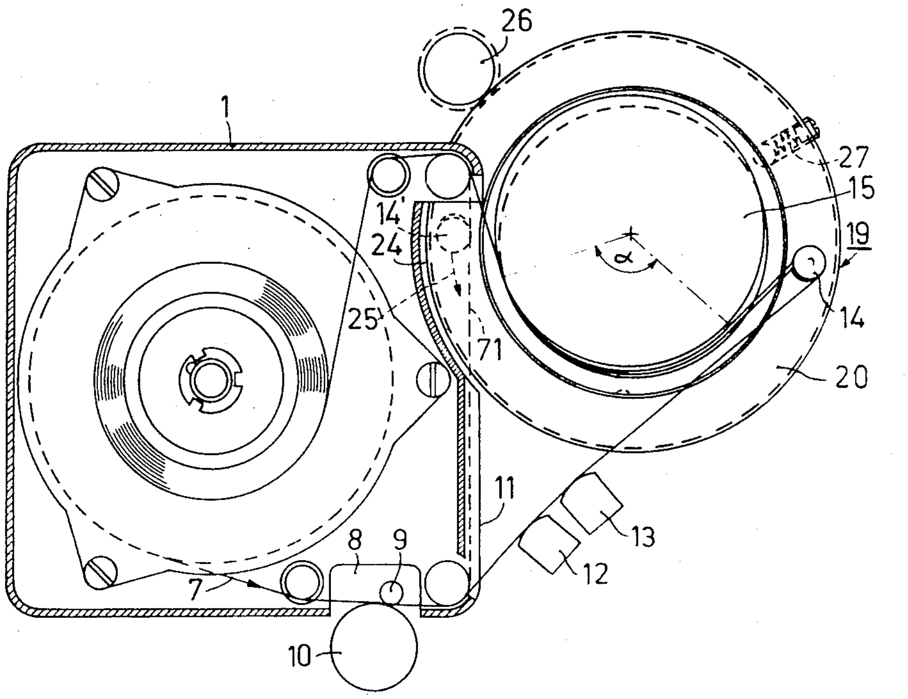
FIG. 1 is a top plan view.
Figure 2:
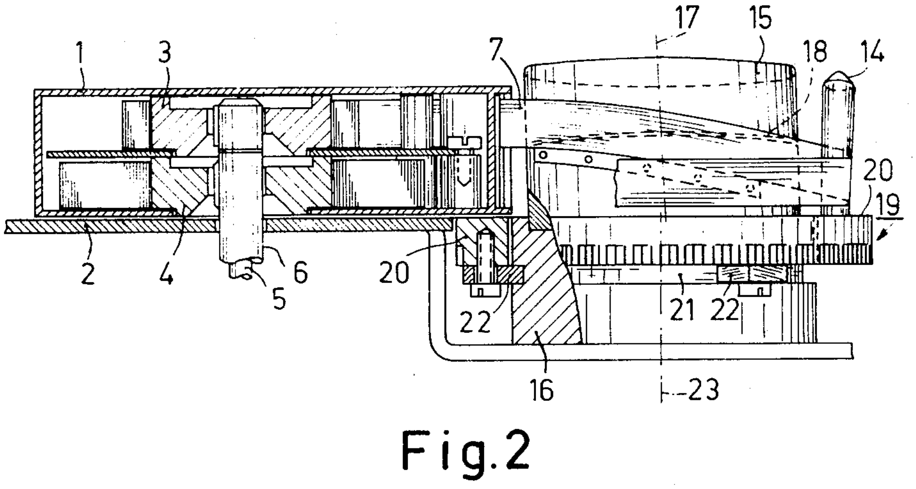
FIG. 2 is a part sectional view, part side elevation of an apparatus in which the tape, which is accommodated in a cassette containing two coaxially arranged reels, is wound by means of a tape guide stud of the tape diverting device around the cylindrical outer surface of a drum for a part of the drum circumference equal to an arc of 120°.

Referring now to FIGS. 1 and 2, a cassette 1 is adapted to be placed on a base plate 2 of an apparatus. When the cassette is placed in position the tape reels 3 and 4, which are coaxially arranged in the cassette one above the other, are coupled with winding spindles 5 and 6 respectively of the apparatus. The drive of the tape 7 is effected in a conventional manner by means of a capstan 9 which projects into an opening 8 in the cassette and engages the tape and to which a pressure roller 10 can be urged. The two Figures show the arrangement in the operative condition in which the pressure roller has been pivoted into engagement with the capstan. The tape is brought out from a shorter side 11 of the cassette at the level of the lower reel 4, travels past, for example, two magnetic heads 12 and 13, subsequently reaches a tape guide stud 14 and then is helically wound around a drum 15 and finally re-enters the cassette at the shorter side 11 at the level of the second reel 3 along a path parallel to that of the tape part leaving the cassette.

The drum 20 is mounted on a support 15 secured to the base plate 2, the drum axis 17 being inclined at an angle to the normal to the main plane of the cassette, so that in known manner the tape is caused by the cooperation of the drum with the tape guide stud 14, which in this embodiment is conical and is inclined at an appropriate angle to the drum to be wound around the cylindrical outer surface of the drum along a helical path, in this embodiment through an angle $\alpha$ of 120°. At the area at which the tape is wound around the drum the signal recording takes place by means of a magnetic head assembly rotating within a gap 18 in the drum.

It is an object of the present invention to provide a tape diverting device 19 which enables a tape to be guided from the cassette into the afore-described operative position in a simple manner but with a high degree of accuracy. For this purpose the tape diverting device 19, which carries the aforementioned tape guide stud 14 by means of a support 20, is arranged so as to be pivotable in an arc of a circle away from the cassette placed on the apparatus and about part of the drum. In this embodiment the support 20 comprises an annular member which is adapted to pivot about the pedestal 16 and which is guided so as to pivot about an axis 23 normal to the principal plane of the cassette by means of a plurality of tags 22 which are arranged along the circumference of the annular member and project into a slit 21 in the pedestal.

In the inoperative position of the tape diverting device the tape guide stud is in a position 14′ shown by broken lines in FIG. 1. When the cassette is placed on the apparatus the tape guide stud enters and opening 24 in the casette and engages the part 7′ of the tape adjacent the said opening and shown by broken lines in FIG. 1. When the tape diverting device is pivoted in the direction indicated by an arrow 25 in order to take up the operative position shown in FIGS. 1 and 2, the tape guide stud 14 engages the tape 7 and winds it around the cylindrical outer surface of the drum so that it occupies the desired travelling position. Since this movement is performed along a circular path around the drum, the tape is wound along the required path around the cylindrical outer surface of the drum with a high degree of accuracy, which is of great importance for such an apparatus. This is ensured in particular by the fact that with such a construction the relative positions of the tape diverting device and the drum can be accurately controlled.

To enable the pivoting movement of the tape diverting device the support 20 is provided with teeth along its circumference which mesh with a pinion 26 which advantageously can be driven by a servo-motor, not shown, arranged to be switched by an operating member of the apparatus. A ball detent 27 provided on the support 20 determines the inoperative and operative positions of the tape diverting device. Obviously, the pivoting movement of the support 20 may be performed in a different manner, for example, by means of a toothed rack actuated by an operating member or by means of a rope or chain.

In the embodiment shown in FIGS. 3 and 4 the support 20 of the tape diverting device 19 is arranged to pivot about an axis 23 parallel to the drum axis 17. The two axes, which are inclined at an angle to a normal to the principal plane of the cassette, are shown symbolically by crosses in the Figure. The two axes are parallel but spaced so that the drum 15 is arranged eccentrically with respect to the support 20. Advantageously the support 20 and the drum 15 form an integral structure arranged to pivot about the axis 23 of the support. As will be seen from FIG. 4, which shows the tape diverting device in its operative condition, the relative positions of the two axes 17 and 23 are chosen so that with the tape wound around the drum the drum axis is closer to the cassette than is the pivoting axis of the tape diverting device. This ensures that when the tape diverting device 19 is pivoted in the direction of the arrow 25 from the inoperative position shown in FIG. 3 into the operative position, the drum follows this pivotal movement and engages the tape so that the tape is securely wound around the drum, especially in the case in which the drum is provided with a tape guide for the tape edge facing the base plate, as will be described more fully hereinafter. By arranging the drum close to the part of the tape in the inoperative position of the tape diverting device and by the fact that the drum moves into the path of the tape when the tape diverting device is pivoted, a particularly compact construction is obtained.

In the embodiment under consideration the tape is to be wound around the drum through 180°. For this purpose the tape diverting device has two tape guide studs 14 and 28 which when the cassette is placed on the apparatus engage the tape. Stud 14 guides the tape with respect to the drum, whilst the other stud (18) maintains the tape travelling between the first-mentioned tape guide stud 14 and the cassette spaced away from the drum. The aforementioned choice of the axis 17 and 23 of the drum and the tape diverting device ensures, as is shown in FIG. 4, that in order for the tape to be wound around the drum through 180°, owing to the movement of the drum into the path of the tape a pivotal movement of the tape diverting device through an angle of less than 180°, namely of about 165°, is required, which is advantageous for the operation of the arrangement.

Obviously, with respect to the choice of the relative positions of the axes 17 and 23 many modifications of the embodiment described are possible, one of which will be described, by way of example, with reference to FIGS. 9 and 10. In this embodiment, the drum moves into the path of the tape through a greater distance and the tape is wound around the drum through 180° by means of a single tape guide stud 14.

Returning to the embodiment shown in FIGS. 3 and 4, some further advantageous features will now be mentioned. The support 20 of the tape diverting device is formed with a projection 29 by means of which the on/off switch 30 of the apparatus can be operated in a manner such that in the inoperative position of the tape diverting device the switch is open. This ensures that in the inoperative condition of the tape diverting device, in which condition a cassette can be placed in the apparatus, no mode of operation of the apparatus can be initiated, thus preventing the tape from being damaged. Obviously it may be ensured in known manner that it is impossible to place a cassette on the apparatus when the pressure roller is urged to the capstan.

In order to avoid damage to the tape during the pivotal movement of the tape diverting device, advantageously any mode of operation of the apparatus which is being performed will be stopped when the tape diverting device is pivoted, preferably at the beginning of this movement. For this purpose the support 20 of the tape diverting device is formed with a further projection 31, which, when the tape diverting device is pivoted from its inoperative position, briefly displaces lever 32, which in turn displaces a holding bar 33 into which mode switches 34, 35 and 36, for example for advance, fast forward and fast return of the tape respectively, snap in known manner in their closed positions so that, when the tape diverting device is pivoted, any mode switch which may be in the closed position returns to its open position. The lever 32 is so disposed relative to the support 20 that at the beginning of the pivotal movement of the tape diverting device from the operative position to the inoperative position the aforementioned projection 29 for operating the on/off switch also operates the lever 32, so that in this case also any switched-in mode is switched out. Obviously, switching out the modes may be effected in a different manner, for example, by the lever 32 operating a conventional automatic stop.

Figure 5:
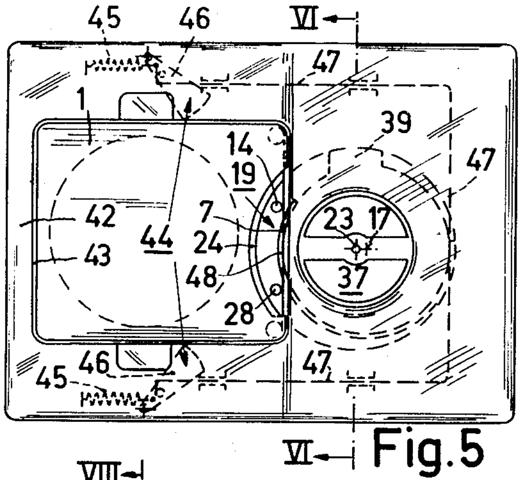
FIGS. 5 to 8 show further modifications of the embodiment shown in FIGS. 3 and 4.
Figure 6:
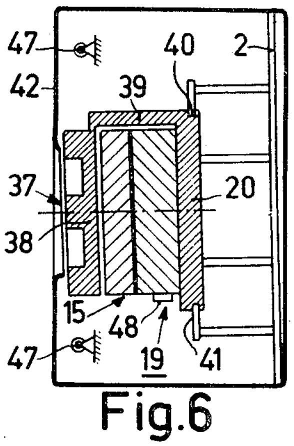
Figure 7:
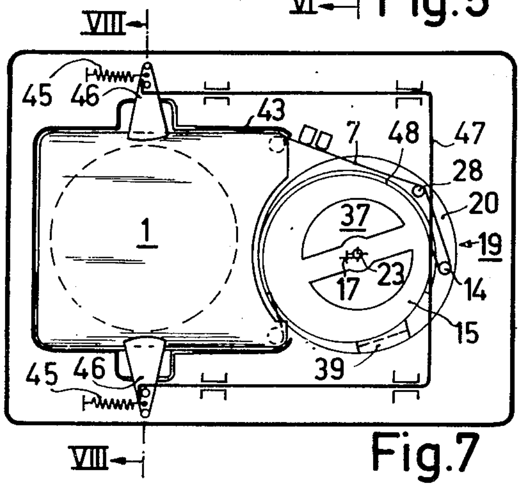
Figure 8:
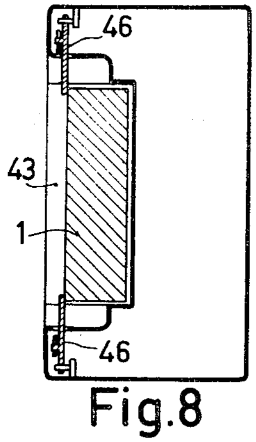

An apparatus equipped with a tape-diverting device according to the embodiment shown in FIGS. 3 and 4 is schematically shown in top plan view in FIG. 5 with the tape diverting device in the inoperative position and in FIG. 7 with said device in the operative position, FIGS. 6 and 8 showing corresponding sectional views taken on the lines VI — VI and VIII — VIII respectively. In this embodiment there is provided for pivoting the tape-diverting device 19, which forms an integral structure with the drum, a handle 37 which has a part 38 which extends as a cover above the drum and is connected to the support 20 of the tape diverting device by a brace 39 extending along the side of the drum. The support 20 is formed with a groove 40 into which lugs 41, secured to the apparatus project, so that the support is pivotable. Thus the handle for pivoting the tape diverting device at the same time forms a cover capable of fitting into the cover plate 42 of the apparatus.

The cassette 1 can be inserted into an opening 43 in the cover plate 42, in which position the tape guide studs 14 and 28 engage the tape. In order to wind the tape around the drum the handle 37 must simply be pivoted through an angle of about 165°. To lock the cassette in its position on the apparatus in this operative condition of the tape diverting device, a locking arrangement 44 is provided which can be operated by the tape diverting device. This locking arrangement comprises two bolts 46 which are pivotably mounted one on either side of the opening 43 and are acted upon by springs 45 and which are linked to a system of levers 47 supported by the edge of the part 38. Since when the tape diverting device is pivoted the edge of the part 38 performs an eccentric movement, the bolts can be operated by means of the lever system. As FIGS. 5, 7 and 8 show, in the inoperative condition of the tape diverting device the bolts have been pivoted out of the area of the opening 43, so that a cassette can be inserted, but in the operative condition of the tape diverting device they engage the top of a cassette which may be accommodated in the opening 43 and thereby lock it in position. At the same time this locking arrangement prevents the insertion of a cassette when the tape diverting device is in its operative condition, since the bolts will then project into the opening.

As FIGS. 5, 6 and 7 show, the drum 15 is in known manner provided with a tape guide member 48 in the form of a strip which is helically wound around the drum and guides the tape along the edge which faces the base plate 2. In the inoperative condition of the tape diverting device this tape guide member is located just within the range of the tape part 7 which extends in the opening 24 in the cassette, so that when the cassette has been placed on the apparatus the tape engages the guide member. As a result, when the tape is wound around the drum this guide member ensures accurate positioning.

In the embodiment shown in FIGS. 11 and 12 the cassette 1 contains tape reels 3 and 4 arranged side by side in a single plane. The tape diverting device 19 and the drum 15 have a common axis 49 which is inclined at an angle to the normal to the principal plane of the cassette, in other words, the axes of the drum and the tape diverting device designated 17 and 23 hereinbefore coincide. The tape diverting device again comprises a support 20, which in this embodiment is arranged to pivot about the drum, which is rigidly secured to the apparatus, and is provided with two tape guide studs 14 and 28. In FIG. 11 the positions which the tape guide studs occupy in the inoperative condition of the tape diverting device and the path along which the tape travels in this condition are shown by broken lines.

In the operative condition of the tape diverting device the tape guide stud 28 and the tape guide stud 14 are required to divert the tape, and the stud 28 also maintains the tape part between and the cassette and the tape guide stud 14 spaced away from the drum. The tape guide studs divert the tape leaving the cassette to a higher level, after which the stud 14 guides the tape tangentially towards the drum, around the cylindrical outer surface of which it describes a helical path through an arc of 180°, and the tape finally re-enters the cassette at the same level at which another part of the tape leaves the cassette and parallel to this part. For this purpose the tape guide studs have been given suitable conical shaped and are skewed to one another and to the drum axis.

Although in the embodiments shown the axis of the drum (15) is inclined at an angle to the normal to the principal plane of the cassette, this is not necessary, but embodiments of the apparatus according to the invention are possible in which the axis of the drum is normal to the main plane of the cassette and the tape is caused to be helically wound around the drum by appropriately designed tape guide studs.

What is claimed is:

1. In an apparatus for recording and/or playback of signals having a wide frequency spectrum carried on a tape carrier accommodated in a cassette, said cassette having an opening across which said tape will extend when not in the operative playback condition, said apparatus comprising a base for supporting thereon said cassette, a drum having a cylindrical surface supported on said base adjacent said cassette, said tape being helically wound thereabout when in an operative position, a tape diverting device movable between an inoperative condition and an operative condition for engaging and drawing a portion of said tape out of said cassette and around part of said drum surface in a helical path, said device comprising a support member formed integrally with said drum and being arranged on said apparatus for pivotal movement about an axis of rotation which is parallel to the longitudinal axis of said drum and offset therefrom, said longitudinal axis of said drum being shifted from a position further from the cassette than the axis of said supporting member prior to moving the tape diverting device to the operative condition to a position closer to said cassette than the axis of said supporting member when said supporting member and drum have been pivoted about said supporting member axis and said tape has been wound about the surface of said drum, and at least one tape guide stud mounted on said support member, said stud projecting through said cassette opening when said cassette is placed in a position on said apparatus for playback, whereby said tape stud will engage said tape and draw said tape out of the cassette and wrap said tape about a portion of said drum as said support member is pivoted about said axis of rotation so that said tape will be wound about said drum in a helical path and into an operative position for playback.

2. The apparatus according to claim 1 further comprising a tape guide member located on said drum for guiding the tape along an edge thereof which faces said base of the apparatus, whereby the tape will bear upon said tape guide member when the cassette is placed on the apparatus with the tape diverting device in the inoperative condition, in which condition said tape guide stud will project through the opening of said cassette and engage the tape.

3. The apparatus according to claim 1 wherein said tape diverting device comprises two tape guide studs mounted on said supporting member, said studs projecting through said cassette opening for engagement with said tape when said cassette is placed on said apparatus, one of said tape guide studs engaging said tape for guiding the tape in one direction about said drum when said diverting device is rotated in that direction, the other of said studs engaging said tape in the same direction for maintaining said tape in a spaced relation between said first mentioned stud and the cassette.

4. The apparatus according to claim 1 wherein said tape is wrapped no more than 180° about said drum.

5. The apparatus according to claim 1 wherein said axis of rotation about which said supporting member is pivoted is arranged normal to the principal plane of the cassette when the cassette is placed in the playback position.

6. The apparatus according to claim 5 wherein the axis of said drum is inclined at an angle to the axis normal to the principal plane of the cassette.

7. The apparatus according to claim 1 further comprising means for rotating said tape diverting device, means for driving said tape when said tape has been drawn out around said drum into the operative playback condition and means for engaging said tape when said tape is in the operative playback condition for picking up said signals.

8. The apparatus according to claim 7 wherein said means for rotating said tape diverting device comprises a servo motor.

9. The apparatus according to claim 7 wherein said means for rotating said tape diverting device comprises a handle mounted on said support and extending above said drum.

10. The apparatus according to claim 7 wherein said means for picking up said signals comprises a magnetic head.

11. The apparatus according to claim 1 further comprising locking members mounted on said apparatus for locking said cassette in its playback position on the apparatus when said tape has been wound about said drum and means cooperating with said tape diverting device for actuating said locking member.

12. The apparatus according to claim 11 wherein said locking members operate to prevent further cassettes from being placed on the apparatus when said tape diverting device has been moved to the operative position.

13. The apparatus according to claim 12 wherein said locking members comprise a pair of bolts pivotally mounted on said apparatus, spring means attached to said bolts and link-members cooperating with said tape diverting device to pivot said bolts into the locking position.

14. The apparatus according to claim 1 further comprising means for preventing operation of said apparatus during the rotational movement of said tape diverting device, said apparatus being allowed to operate when said tape has been moved to an operative playback condition by said tape diverting device.

15. The apparatus according to claim 14 wherein said means for preventing operation of said apparatus comprises a switch mounted on said apparatus, and projecting means mounted on said support member of said diverting device for engagement with said switch whereby said switch is closed to allow operation of the apparatus when said supporting member has been rotated to the operative condition.

16. The apparatus according to claim 15 further comprising means for terminating operation of the apparatus which may have been initiated at the beginning of the rotational movement of said tape diverting device.

17. The apparatus according to claim 16 wherein said means for terminating operation of said apparatus comprises a lever pivotally mounted on said apparatus for engaging the operative switches of said apparatus and projecting means mounted on said support member for engaging said lever and displacing said lever for returning said switches to their inoperative positions.

* * * * *